US012764007B2

(12) United States Patent
Li et al.

(10) Patent No.: US 12,764,007 B2
(45) Date of Patent: Oct. 13, 2026

(54) METHOD FOR TRANSMITTING SIGNALS AND COMMUNICATION DEVICE

(71) Applicants: Beijing BOE Technology Development Co., Ltd., Beijing (CN); BOE Technology Group Co., Ltd., Beijing (CN)

(72) Inventors: Wei Li, Beijing (CN); Biqi Li, Beijing (CN); Li Han, Beijing (CN); Feng Qu, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 314 days.

(21) Appl. No.: 18/291,925

(22) PCT Filed: Oct. 28, 2022

(86) PCT No.: PCT/CN2022/128270
§ 371 (c)(1),
(2) Date: Jan. 25, 2024

(87) PCT Pub. No.: WO2024/087172
PCT Pub. Date: May 2, 2024

(65) Prior Publication Data

US 2025/0088401 A1 Mar. 13, 2025

(51) Int. Cl.

| | |
|---|---|
| ***G06K 9/00*** | (2022.01) |
| ***G06T 7/162*** | (2017.01) |
| ***H04L 27/26*** | (2006.01) |

(52) U.S. Cl.
CPC .......... *H04L 27/2628* (2013.01); *G06T 7/162* (2017.01); *G06T 2207/20056* (2013.01)

(58) Field of Classification Search
CPC ...................... G06T 2207/20056; G06T 7/162
See application file for complete search history.

(56) References Cited

U.S. PATENT DOCUMENTS

| | | | | |
|---|---|---|---|---|
| 10,014,002 | B2 * | 7/2018 | Koretzky ................ | G10L 25/30 |
| 10,060,961 | B1 * | 8/2018 | Fleizach .................. | H04Q 9/00 |
| 2010/0002571 | A1 * | 1/2010 | Liao .................... | H04L 27/2644 370/344 |
| 2014/0086014 | A1 | 3/2014 | Kobayashi et al. | |
| 2015/0372762 | A1 | 12/2015 | Zhang et al. | |
| 2016/0072732 | A1 * | 3/2016 | Hong .................. | H04L 49/3009 370/392 |

(Continued)

FOREIGN PATENT DOCUMENTS

| | | |
|---|---|---|
| CN | 103561661 A | 2/2014 |
| CN | 106936754 A | 7/2017 |

(Continued)

*Primary Examiner* — Hadi Akhavannik
(74) *Attorney, Agent, or Firm* — XSENSUS LLP

(57) ABSTRACT

Provided is a method for transmitting signals, including: acquiring a first image by performing a Fourier transform on first data to be transmitted; performing first preprocessing on the first image, wherein the first preprocessing comprises at least one of compression, encryption, or verification; acquiring second data by performing an inverse Fourier transform on the first image after the first preprocessing; and modulating the second data into a first radio frequency signal, and transmitting the first radio frequency signal.

19 Claims, 20 Drawing Sheets

(56) References Cited

U.S. PATENT DOCUMENTS

| | | | | |
|---|---|---|---|---|
| 2018/0064423 | A1 | 3/2018 | Kawashima | |
| 2020/0107818 | A1 | 4/2020 | Keshet et al. | |
| 2021/0013959 | A1 | 1/2021 | Yuan et al. | |
| 2021/0029500 | A1* | 1/2021 | Ye | G06N 20/00 |
| 2021/0281460 | A1 | 9/2021 | Hu et al. | |
| 2022/0263691 | A1* | 8/2022 | Furtek | H04L 25/03872 |
| 2023/0362588 | A1* | 11/2023 | Golestanian | H04W 4/33 |
| 2024/0259984 | A1* | 8/2024 | Ghazvinian Zanjani | G06N 3/088 |

FOREIGN PATENT DOCUMENTS

| | | | |
|---|---|---|---|
| CN | 106972891 | A | 7/2017 |
| CN | 107506681 | A | 12/2017 |
| CN | 107530057 | A | 1/2018 |
| CN | 107705806 | A | 2/2018 |
| CN | 111000590 | A | 4/2020 |
| CN | 111200572 | A | 5/2020 |
| CN | 110149642 | B | 12/2021 |
| CN | 114205821 | A | 3/2022 |

* cited by examiner

METHOD FOR TRANSMITTING SIGNALS AND COMMUNICATION DEVICE

CROSS-REFERENCE TO RELATED APPLICATION

The present disclosure is a U.S. national stage of international application No. PCT/CN2022/128270, filed on Oct. 28, 2022, the disclosure of which is herein incorporated by reference in its entirety.

TECHNICAL FIELD

The present disclosure relates to the field of communication technologies, in particular to a method for transmitting signals and a communication device.

BACKGROUND

A wireless communication device is capable of implementing transmission and reception of signals. During the signal transmission, the wireless communication device modulates data to be transmitted to acquire a radio frequency signal. Then, the wireless communication device amplifies the radio frequency signal and transmits the radio frequency signal via an antenna.

SUMMARY

The present disclosure provides a method for transmitting signals and a communication device. The technical solutions are as follows.

According to some embodiments of the present disclosure, a method for transmitting signals is provided. The method includes:

- acquiring a first image by performing a Fourier transform on first data to be transmitted;
- performing first preprocessing on the first image, wherein the first preprocessing includes at least one of compression, encryption, or verification;
- acquiring second data by performing an inverse Fourier transform on the first image after the first preprocessing; and
- modulating the second data into a first radio frequency signal, and transmitting the first radio frequency signal.

According to some embodiments of the present disclosure, a method for transmitting signals is provided. The method includes:

- demodulating a radio frequency signal as received into first reception data;
- acquiring a target image by performing a Fourier transform on the first reception data;
- performing preprocessing on the target image, wherein the preprocessing includes at least one of decompression, decryption, or verification; and
- acquiring second reception data by performing an inverse Fourier transform on the target image after the preprocessing.

According to some embodiments of the present disclosure, a communication device is provided. The communication device includes: a data processing module and a signal-transmitting assembly, wherein

- the data processing module is configured to: perform a Fourier transform on first data to be transmitted to acquire a first image, perform first preprocessing on the first image, and perform an inverse Fourier transform on the first image after the first preprocessing to acquire second data, wherein the first preprocessing includes at least one of compression, encryption, or verification; and
- the signal-transmitting assembly is configured to: modulate the second data into a first radio frequency signal, and transmit the first radio frequency signal.

According to some embodiments of the present disclosure, a communication device is provided. The communication device includes a data processing module and a signal-receiving assembly, wherein

- the signal-receiving assembly is configured to demodulate a radio frequency signal as received into first reception data; and
- the data processing module is configured to: perform an Fourier transform on the first reception data to acquire a target image, perform preprocessing on the target image, and perform an inverse Fourier transform on the target image after the preprocessing to acquire second reception data, wherein the preprocessing includes at least one of decompression, decryption, or verification.

According to some embodiments of the present disclosure, a communication device is provided. The communication device includes a memory, a processor, and a computer program stored in the memory and capable of running on the processor, wherein the processor, when executing the computer program, is caused to perform the method for transmitting signals according to the foregoing embodiments.

According to some embodiments of the present disclosure, a non-transitory computer-readable storage medium is provided. The computer-readable storage medium stores a computer program, wherein the computer program, when loaded and executed by a processor, causes the processor to perform the method for transmitting signals according to the foregoing embodiments.

According to some embodiments of the present disclosure, a computer program product including instructions is provided. The computer program product, when run by a computer, causes the computer to perform the method for transmitting signals according to the foregoing embodiments.

BRIEF DESCRIPTION OF DRAWINGS

For clearer descriptions of the technical solutions in the embodiments of the present disclosure, the following briefly describes the accompanying drawings required for describing the embodiments. Apparently, the accompanying drawings in the following description show merely some embodiments of the present disclosure, and other drawings may be derived by persons skilled in the art from these accompanying drawings without creative efforts.

DETAILED DESCRIPTION

For clearer descriptions of the objectives, technical solutions, and advantages of the present disclosure, embodiments of the present disclosure are described in detail below with reference to the accompanying drawings.

A wireless communication device is capable of implementing transmission and reception of signals. During the signal transmission, the wireless communication device modulates data to be transmitted to acquire a radio frequency signal. Then, the wireless communication device amplifies the radio frequency signal and transmits the radio frequency signal through an antenna.

However, the reliability of the foregoing manner of transmitting a radio frequency signal is relatively low.

Figure 1:
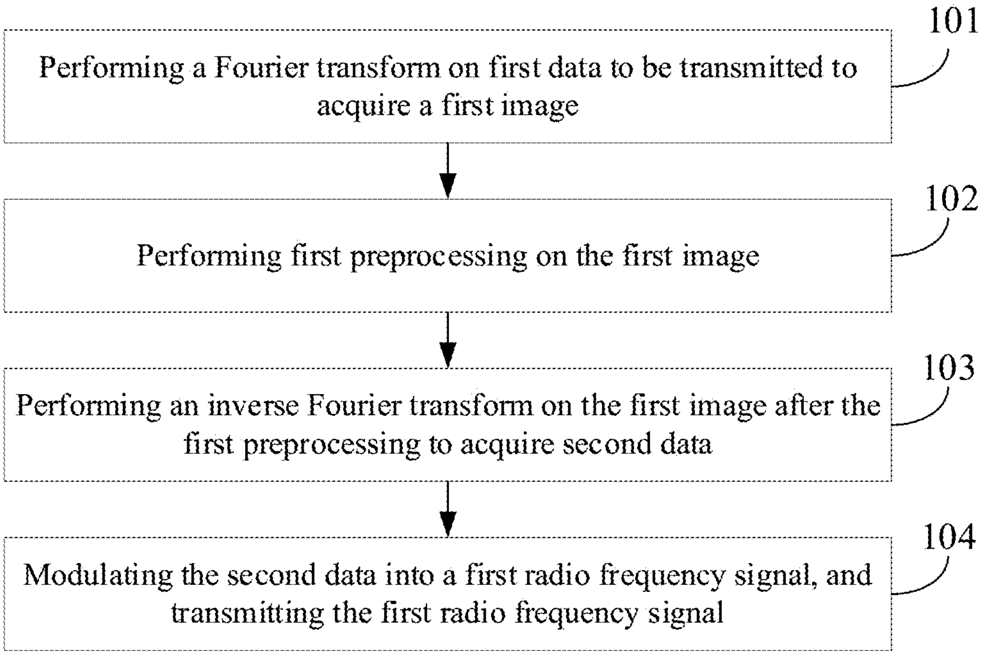
FIG. 1 is a flowchart of a method for transmitting signals according to some embodiments of the present disclosure.

Some embodiments of the present disclosure provide a method for transmitting signals. The method for transmitting signals is applicable to a communication device. With reference to FIG. 1, the method includes the following steps.

In step 101, a Fourier transform is performed on first data to be transmitted to acquire a first image.

In the embodiments of the present disclosure, the communication device calls a Fourier transform function to process the first data to be transmitted, thereby acquiring the first image. In some embodiments, the Fourier transform is a fast Fourier transform (FFT).

In step 102, first preprocessing is performed on the first image.

The first preprocessing includes at least one of compression, encryption, or verification. For example, the first preprocessing includes compression, encryption, and verification.

In step 103, an inverse Fourier transform is performed on the first image after the first preprocessing to acquire second data.

Because the second data is acquired by performing the inverse Fourier transform on the first image after the first preprocessing, compared with the first data, the second data is compressed, and/or encrypted, and/or verified data.

In step 104, the second data is modulated into a first radio frequency signal, and the first radio frequency signal is transmitted.

In the embodiments of the present disclosure, after acquiring the second data, the communication device modulates the second data to acquire the first radio frequency signal. Then, the communication device transmits the first radio frequency signal through an antenna.

In summary, the embodiments of the present disclosure provide a method for transmitting signals, according to which the communication device converts data to be transmitted into an image, converts the image as preprocessed into data, and performs modulation. In this way, it can be ensured that the transmission reliability of a radio frequency signal is higher. In addition, as data to be transmitted is preprocessed through image processing, the processing efficiency of the data is improved.

In some embodiments, the communication device is a wireless communication device. The wireless communication device implements communication according to a wireless communication protocol. The wireless communication protocol may be one of the following protocols: a wireless fidelity (Wi-Fi) communication protocol, a ZigBee (ZigBee) communication protocol, a Bluetooth (Bluetooth) communication protocol, a cellular mobile communication protocol, and a low power wide area network (LPWAN) communication protocol.

Bluetooth connection based on the Bluetooth protocol is near-field wireless connection with low cost and is a special near-field wireless technical connection used for establishing communication for fixed and/or mobile devices. The low power wide area network (LPWAN) communication protocol includes a LoRa communication protocol. The cellular mobile communication protocol includes a 2-generation (G) mobile communication technology communication protocol (2G communication protocol for short), a 3G communication protocol, a 4G communication protocol, and a 5G communication protocol.

The 2G communication technology takes a digital voice transmission technology as the core and has a user experience rate of 10 kilobits per second (kbps) and a peak rate of 100 kbps. The 2G communication protocol is a specification standard of 2-generation mobile phone communication technologies. The 3G communication technology is a cellular mobile communication technology that supports high-speed data transmission. The 4G communication technology is a better improvement than the 3G communication technology. Compared with the 3G communication technology, the 4G communication technology combines the wireless local area network (WLAN) technology with the 3G communication technology, so that an image transmission speed is faster, and it can be ensured that the image display effect is better. The 5G communication technology is a new-generation broadband mobile communication technology with the characteristics of high speed, low latency, and massive connection.

Figure 2:
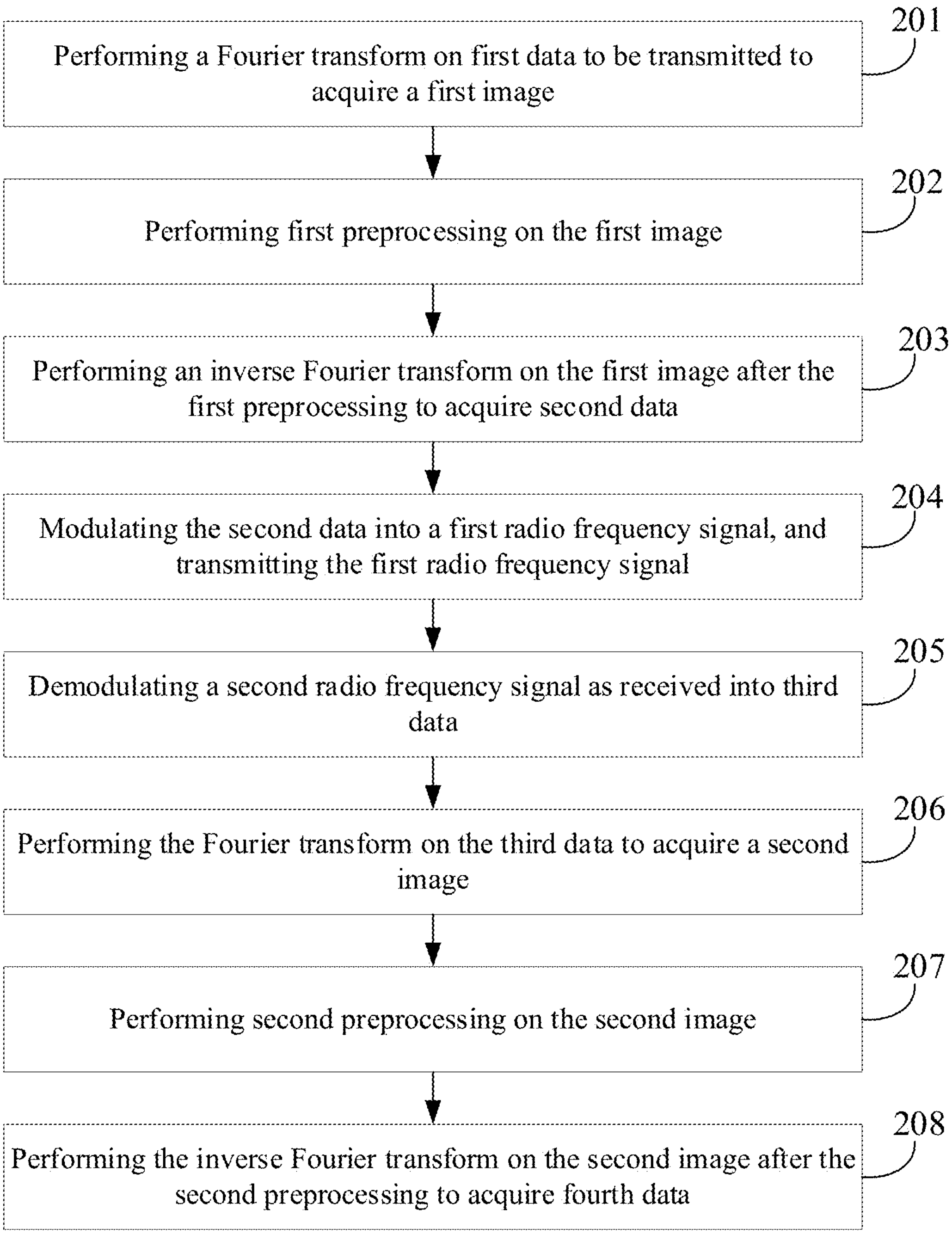
FIG. 2 is a flowchart of another method for transmitting signals according to some embodiments of the present disclosure.

FIG. 2 is a flowchart of another method for transmitting signals according to some embodiments of the present disclosure. The method is applicable to a communication device. With reference to FIG. 2, the method includes the following steps.

In step 201, a Fourier transform is performed on first data to be transmitted to acquire a first image.

The first data is a digital signal.

In the embodiments of the present disclosure, the communication device calls a Fourier transform function to process the first data to be transmitted, thereby acquiring the first image. In some embodiments, the Fourier transform is a fast Fourier transform (FFT).

In some embodiments, the first image is a spectrogram of the first data. The spectrogram of the first data is a graph of frequencies of the first data over time.

In some embodiments, the first image is a coded image of the first data. In this case, a process in which the communication device acquires the first image is as follows: the communication device first performs the Fourier transform on the first data to be transmitted to acquire the spectrogram of the first data, and then, the communication device determines a first coded image corresponding to the spectrogram of the first data as the first image based on a mapping relationship between spectrograms and coded images. The mapping relationship between the spectrograms and the coded images is pre-stored in the communication device.

In some embodiments, the first image is a graph of sub-carrier spacing along with symbols.

In the embodiments of the present disclosure, the first coded image is a two-dimensional code image or a bar code image. For example, the first coded image is a two-dimensional code image. The two-dimensional code image is a quick response (QR) code image.

A QR code image is an image that can record data symbol information and uses a particular geometric figure in a black and white pattern distributed in a plane (in two dimensions) according to a specific rule. The QR code image is square and is composed of a QR code and a quiet zone surrounding the QR code. The composition of the QR code is described below by using a QR code of version 7 as an example.

Figure 3:
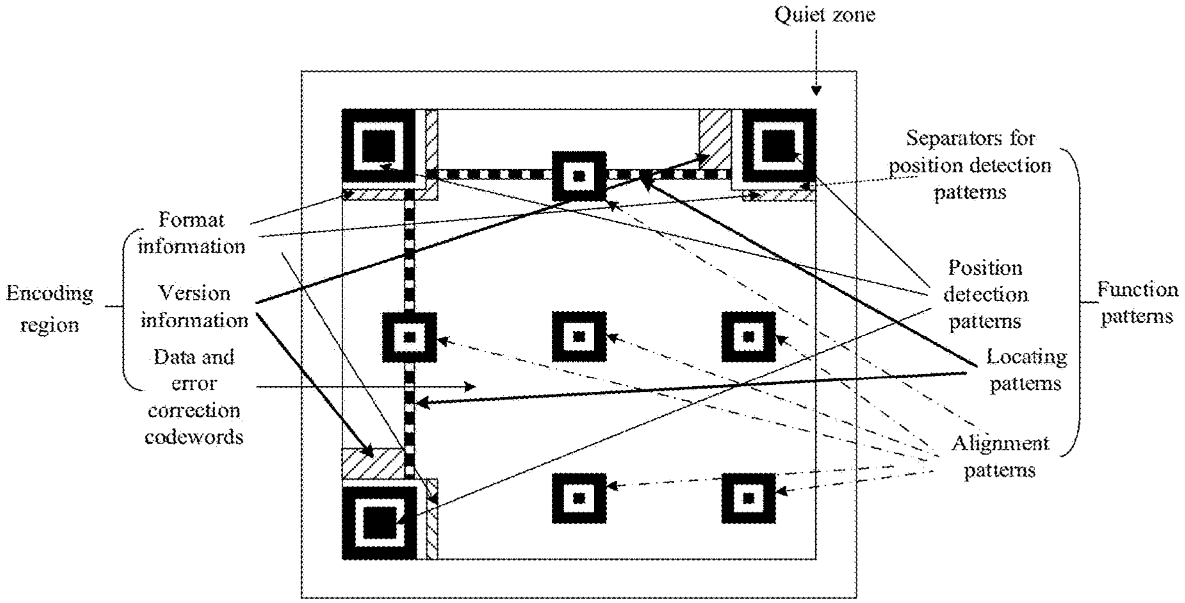
FIG. 3 is a schematic structural diagram of a QR code image according to some embodiments of the present disclosure.

With reference to FIG. 3, the QR code includes an encoding region and function patterns. The function patterns include position detection patterns, separators for the position detection patterns, locating patterns, and alignment patterns. The function patterns cannot be used for data encoding.

All of the position detection patterns, the separators for the position detection patterns, and the locating patterns are used for positioning the QR code in the process of generating a QR code image. The position detection pattern takes the shape of the Chinese character "回". The locating pattern includes a plurality of black and white grids which are alternately arranged. Position detection patterns (or separators for the position detection patterns, or locating patterns) are fixed at positions in each two-dimensional code image and only differ in sizes (namely, dimensions). For example, the position detection patterns are usually disposed at the upper left corner, the lower left corner, and the upper right corner of the two-dimensional code image. The separators for the position detection patterns are adjacent to the position detection patterns.

The alignment patterns are used for correcting the shape of the QR code image. The quantity and the positions of the alignment patterns depend on the size (namely, dimension) of the two-dimensional code image.

Information recorded in the encoding region includes format information of the QR code, version information of the QR code, code data, and error correction codewords. The format information is used to represent an error correction level of the QR code. The error correction level is L, M, Q, or H. L indicates that about 7% of data codewords can be corrected. M indicates that about 15% of data codewords can be corrected. Q indicates that about 25% of data codewords can be corrected. H indicates that about 30% of data codewords can be corrected.

The version information indicates the specification of the QR code. The QR code has a matrix of 40 specifications in total (generally black and white), from 21×21 (version 1) to 177×177 (version 40). Each side of a symbol of one version has 4 more modules than each side of a symbol of a previous version. The code data is data actually stored in the QR code. The error correction codewords are used to correct an error caused by damage of the QR code.

It may be understood that the process of acquiring a QR code based on data (also referred to as a character) to be encoded includes the following steps. Step 1: Data analysis, implemented by determining the type of the character to be encoded, converting the character into a symbol character according to a corresponding character set, and selecting an error correction level. Under the condition that the specification of the QR code is specified, a higher error correction level indicates a smaller maximum capacity of the QR code, namely, a smaller quantity of data that can be actually stored in the QR code.

Step 2: Data encoding, implemented by converting the data to be encoded into a bit stream. Every eight bits in the bit stream indicates a codeword so that a data codeword sequence is acquired. The data codeword sequence is data actually stored in the QR code. Step 3: Error correction encoding, implemented by partitioning the above codeword sequence as required, and generating error correction codewords based on an error correcting level and codewords of blocks. Then, the error correction codewords are added after the data codeword sequence to acquire new sequences. Step 4: Construction of final data information, implemented by sequentially putting the new sequences generated above into the blocks shown in FIG. 4 under the condition that the specification is determined.

Step 5: Masking, implemented by using a mask pattern in an encoding region, so that dark regions (for example, black regions) and pale regions (for example, white regions) in the QR code can be distributed at an optimal ratio. Step 6: Addition of format information and version information, implemented by generating the format information and the version information, and putting the information into corresponding blocks.

Figure 4:
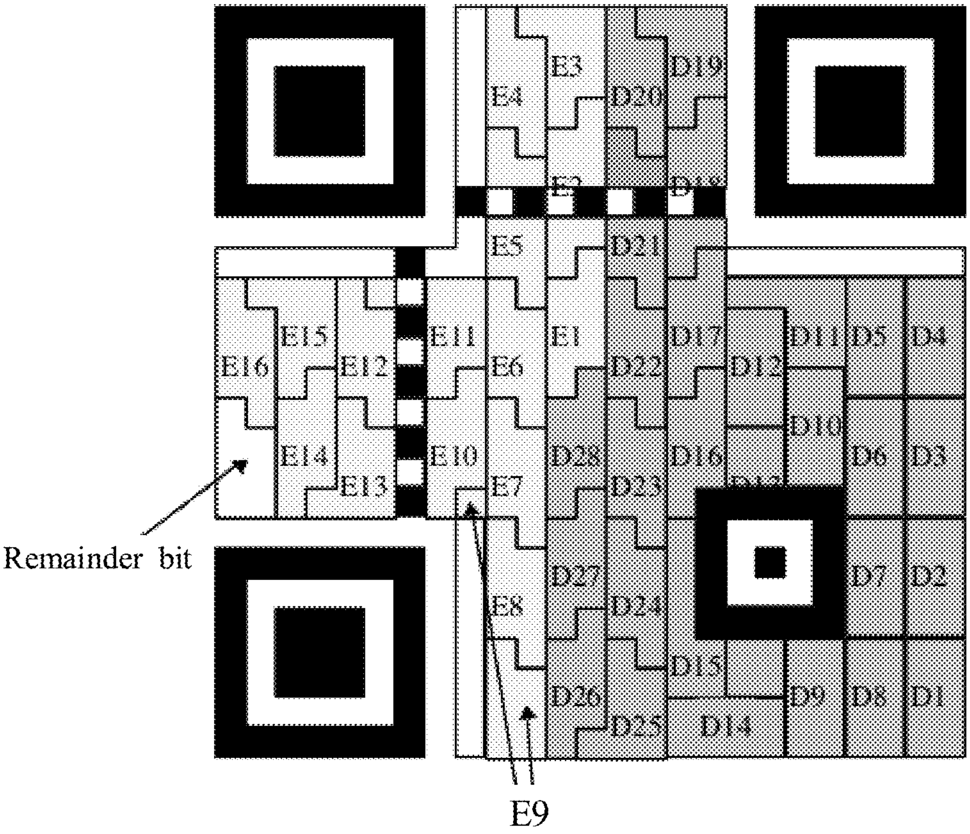
FIG. 4 is a schematic diagram of a matrix of a QR code image according to some embodiments of the present disclosure.

It can be learned from FIG. 4 that the QR code further includes a remainder bit chunk.

In step 202, first preprocessing is performed on the first image.

The first preprocessing includes at least one of compression, encryption, or verification. For example, the first preprocessing includes compression, encryption, or verification. In some embodiments, in a data transmitting process, the verification includes adding a verification code.

In some embodiments, the communication device inputs the first image into a first image preprocessing model to acquire the first image after the first preprocessing output by the first image preprocessing model. The first image preprocessing model is acquired by training a plurality of first sample image sets. Each first sample image set includes a first sample image and a second sample image. The first sample image is acquired by performing a Fourier transform on first sample data. The second sample image is acquired by performing the Fourier transform on the first sample data after the first preprocessing.

In some embodiments, the first image preprocessing model is a neural network model (for example, a convolutional neural network). Therefore, the method provided in the embodiments of the present disclosure combines artificial intelligence (for example, neural network) with a signal processing process, so that the communication rate and the communication bandwidth utilization rate of the communication device as well as the security and the reliability of communication are improved.

In step 203, an inverse Fourier transform is performed on the first image after the first preprocessing to acquire second data.

Because the second data is acquired by performing the inverse Fourier transform on the first image after the first preprocessing, compared with the first data, the second data is compressed, and/or encrypted, and/or verified data. The second data is time domain data.

In the embodiments of the present disclosure, the communication device calls an inverse Fourier transform function to process the first image after the first preprocessing, thereby acquiring the second data. In some embodiments, the inverse Fourier transform is an inverse fast Fourier transform (IFFT).

In step 204, the second data is modulated into a first radio frequency signal, and the first radio frequency signal is transmitted.

After acquiring the second data, the communication device modulates the second data to acquire the first radio frequency signal. Then, the communication device transmits the first radio frequency signal.

In some embodiments, the communication device first processes the second data by using a digital-to-analog converter (DAC) to convert the second data from a digital signal to an analog signal. Then, the communication device modulates the analog signal into the first radio frequency signal.

In the embodiments of the present disclosure, with reference to FIG. 5 to FIG. 9, the communication device includes a data processing module 100 and a signal-transmitting assembly 200. The data processing module 100 performs step 201 to step 203. The signal-transmitting assembly 200 performs step 204.

With reference to FIG. 10 to FIG. 15, the data processing module 100 includes a processing assembly 110 and an interface circuit 120. The processing assembly 110 is connected to the signal-transmitting assembly through the interface circuit 120. The processing assembly performs step 201 to step 203, and transmits the second data acquired by performing step 201 to step 203 to the signal-transmitting assembly through the interface circuit 120. In some embodiments, the interface circuit 120 is an adapter or an interface card.

In the embodiments of the present disclosure, as shown in FIG. 5 to FIG. 8, the signal-transmitting assembly 200 includes a radio frequency antenna 210 and a transmitter 220 connected to the radio frequency antenna 210. The transmitter 220 modulates the second data into a first radio frequency signal. The radio frequency antenna 210 transmits the first radio frequency signal.

In some embodiments, the transmitter 220 is one of the following: a heterodyne transmitter, a superheterodyne transmitter, a zero intermediate frequency transmitter, a broadband intermediate frequency transmitter, or a low intermediate frequency transmitter. The radio frequency antenna 210 is a single antenna or an array antenna.

In step 205, a second radio frequency signal as received is demodulated into third data.

In the embodiments of the present disclosure, the communication device further receives the second radio frequency signal, and acquires the third data by demodulating the second radio frequency signal as received.

Figure 9:
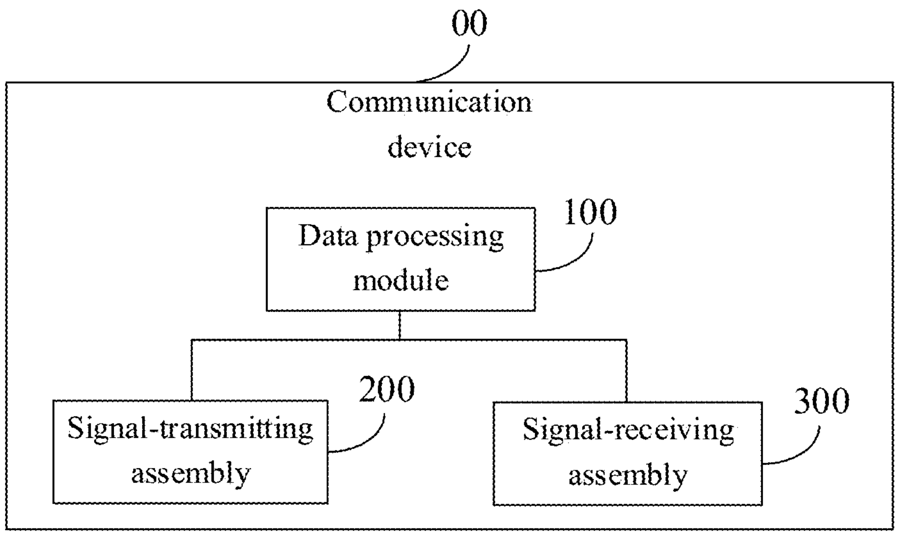
FIG. 9 is a schematic structural diagram of yet another communication device according to some embodiments of the present disclosure.

In the embodiments of the present disclosure, with reference to FIG. 9, the communication device 00 further includes a signal-receiving assembly 300. The signal-receiving assembly 300 is connected to the processing assembly through the interface circuit. The signal-receiving assembly receives the second radio frequency signal, demodulates the second radio frequency signal as received into the third data, and transmits the third data to the processing assembly through the interface circuit.

In some embodiments, the signal-receiving assembly 300 includes a radio frequency antenna and a receiver connected to the radio frequency antenna. The radio frequency antenna receives the second radio frequency signal. The receiver demodulates the second radio frequency signal into the third data.

In some embodiments, the radio frequency antenna included in the signal-receiving assembly 300 is the radio frequency antenna in the signal-transmitting assembly 200, that is, the transmitter and the receiver share the same radio frequency antenna.

In some embodiments, the receiver may be one of the following receivers: a heterodyne receiver, a superheterodyne receiver, a zero intermediate frequency receiver, a broadband intermediate frequency receiver, and a low intermediate frequency receiver.

In step 206, a Fourier transform is performed on the third data to acquire a second image.

The implementation process of step 206 refers to the implementation process of step 201. Details are not described herein again in the embodiments of the present disclosure.

In some embodiments, the second image is a spectrogram of the third data. The spectrogram is a graph of frequencies of the third data over time.

In some embodiments, the second image is a coded image. In this case, a process in which the communication device acquires the second image is as follows: the communication device first performs the Fourier transform on the third data to acquire the spectrogram of the third data, and then, the communication device determines a second coded image corresponding to the spectrogram of the third data as the second image based on the mapping relationship between the spectrograms and the coded images.

The second coded image is a two-dimensional code image or a bar code image, for example, is a two-dimensional code image.

In step 207, second preprocessing is performed on the second image.

The second preprocessing includes at least one of decompression, decryption, or verification. For example, the second preprocessing includes decompression, decryption, and verification.

In some embodiments, the communication device inputs the second image into a second image preprocessing model to acquire the second image after the second preprocessing output by the second image preprocessing model. The second image preprocessing model is acquired by training a plurality of second sample image sets. Each second sample image set includes a third sample image and a fourth sample image. The third sample image is acquired by performing the Fourier transform on second sample data. The fourth sample image is acquired by performing the Fourier transform on the second sample data after the second preprocessing.

In step 208, an inverse Fourier transform is performed on the second image after the second preprocessing to acquire fourth data.

Because the fourth data is acquired after the communication device performs the inverse Fourier transform on the second image after the second preprocessing, compared with the third data, the fourth data is decompressed, and/or decrypted, and/or verified data.

It may be understood that, the implementation process of step 208 refers to a related implementation process of step 203. Details are not described herein again in the embodiments of the present disclosure. Step 205 to step 207 are performed by the processing assembly in the data processing module.

In the embodiments of the present disclosure, the processing assembly in the data processing module 100 includes at least one processing device. Each processing device is one of the following: a digital sign processor (DSP), a field programmable gate array (FPGA), a central processing unit (CPU), an embedded processor, and a system on a chip (SOC). An SOC may also be referred to as a system-on-a-chip.

In some embodiments, the embedded processor is an advanced RISC machines (ARM) processor. RISC is short for reduced instruction set computer, that is, means a reduced instruction set computer.

Figure 10:
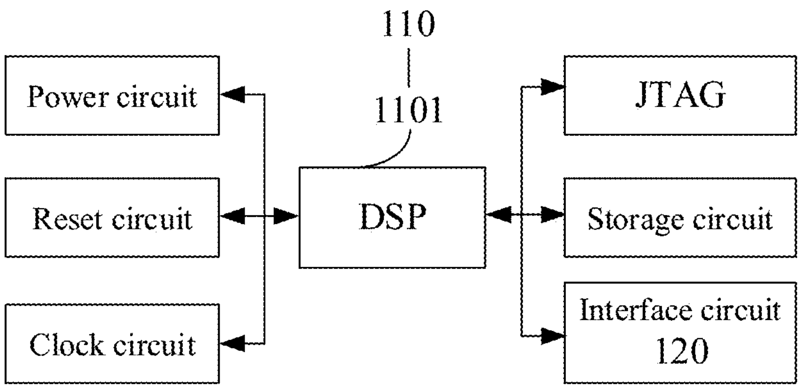
FIG. 10 is a schematic structural diagram of a data processing module according to some embodiments of the present disclosure.
Figure 11:
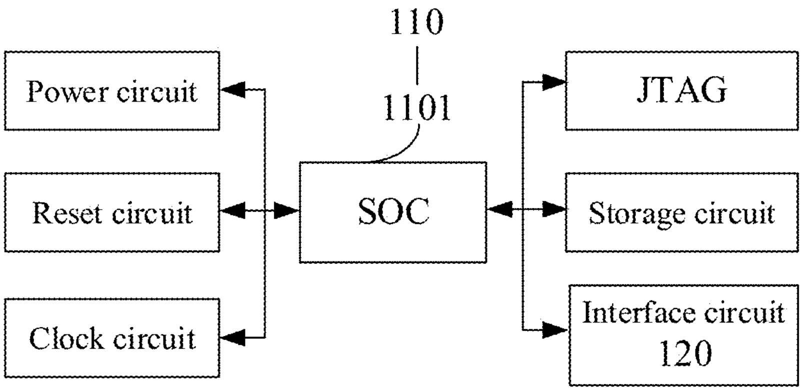
FIG. 11 is a schematic structural diagram of another data processing module according to some embodiments of the present disclosure.
Figure 12:
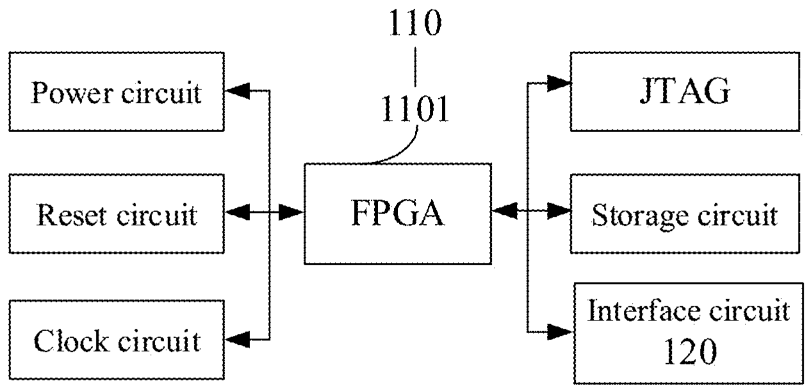
FIG. 12 is a schematic structural diagram of still another data processing module according to some embodiments of the present disclosure.
Figure 13:
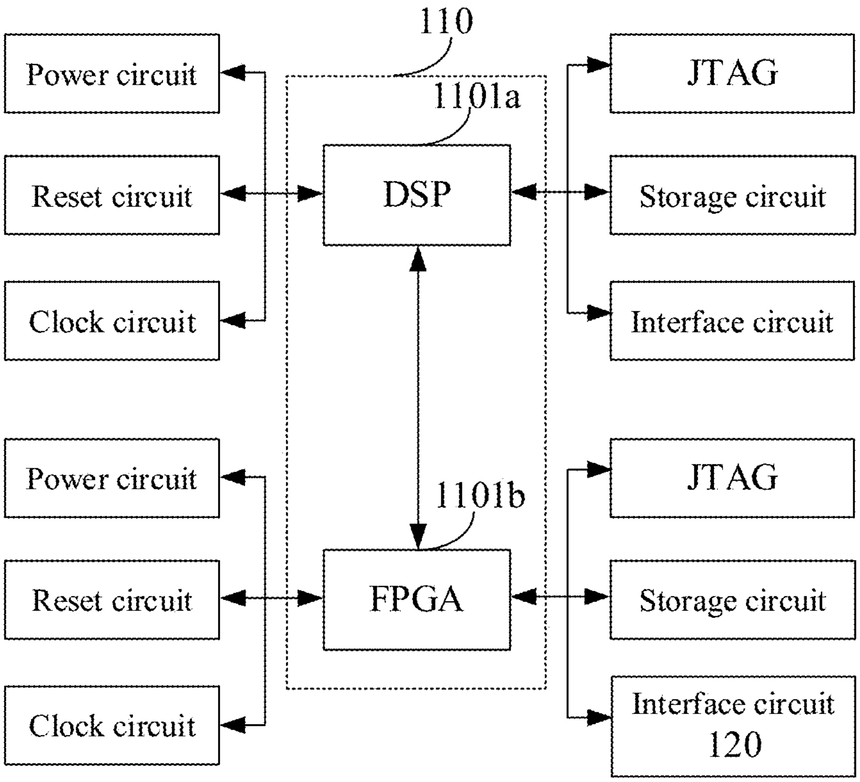
FIG. 13 is a schematic structural diagram of yet another data processing module according to some embodiments of the present disclosure.
Figure 14:
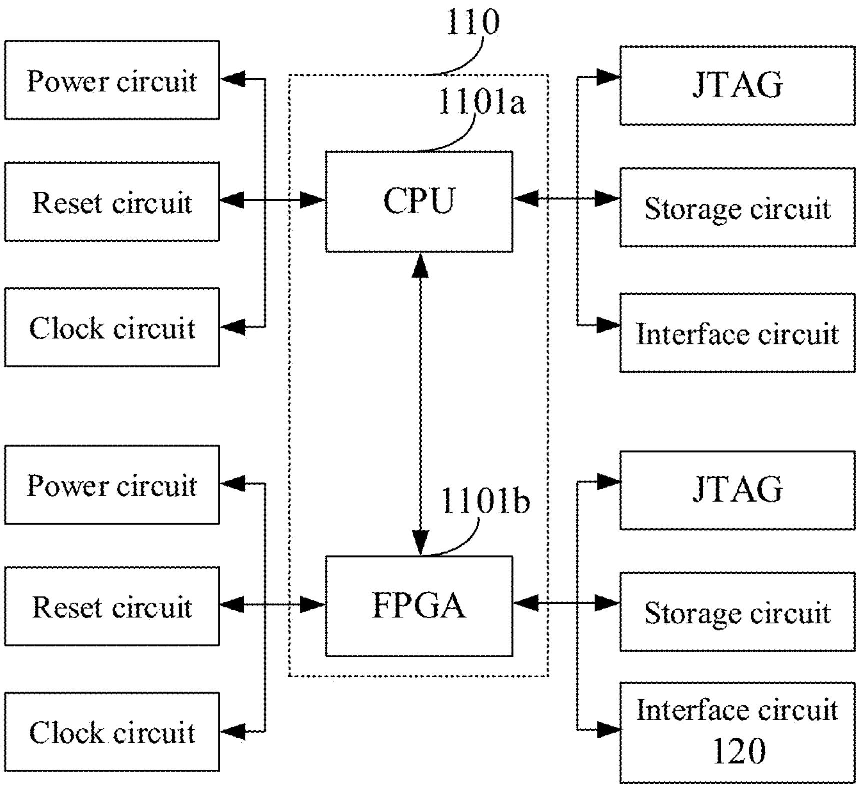
FIG. 14 is a schematic structural diagram of yet another data processing module according to some embodiments of the present disclosure.
Figure 15:
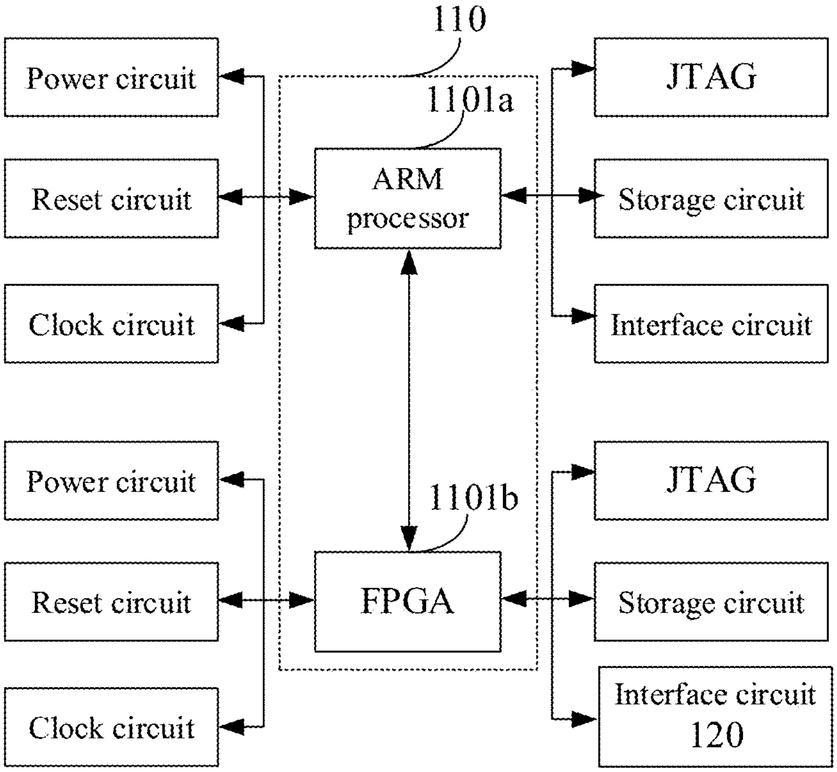
FIG. 15 is a schematic structural diagram of yet another data processing module according to some embodiments of the present disclosure.

With reference to FIG. 10 to FIG. 12, the processing assembly 110 includes one processing device 1101. Alternatively, with reference to FIG. 13 to FIG. 15, the processing assembly 110 includes two processing devices. For example, as shown in FIG. 13, the processing assembly 110 includes a DSP 1101*a* and an FPGA 1101*b*. As shown in FIG. 14, the processing assembly 110 includes a CPU 1101*a* and an FPGA 1101*b*. For another example, as shown in FIG. 15, the processing assembly 110 includes an ARM processor 1101*a* and a FPGA 1101*b*.

In some embodiments, for an implementation in which the processing assembly includes two processing devices, in the signal transmitting process, the FPGA in the two processing devices preforms step 201 and step 203, and the other one of the two processing devices (for example, the DSP, the CPU, or the ARM processor) performs step 202. In other words, the FPGA performs the Fourier transform on the first data to acquire the first image, and transmits the first image to the other processing device, so that the other processing device can perform the first preprocessing on the first image. Then, the FPGA performs the inverse Fourier transform on the first image after the first preprocessing to acquire the second data, and transmits the second data to the signal-transmitting assembly through the interface circuit.

In the signal receiving process, the FPGA performs step 206 and step 208, and the other processing device performs step 207. In other words, the FPGA performs a Fourier transform on the third data to acquire the second image, and transmits the second image to the other processing device, so that the other processing device can perform the second preprocessing on the second image. Then, the FPGA performs an inverse Fourier transform on the second image after the second preprocessing to acquire the fourth data.

In some embodiments, for an implementation in which the processing assembly includes two processing devices, the interface circuit described above is an interface circuit connected to the FPGA. In some embodiments, the data processing module further includes an interface circuit connected to the other processing device.

In the embodiments of the present disclosure, with reference to FIG. 10 to FIG. 15, the data processing module further includes a power circuit, a reset circuit, a clock circuit, a storage circuit, and a joint test action group (JTAG) interface that are connected to each processing device included in the data processing module.

Figure 5:
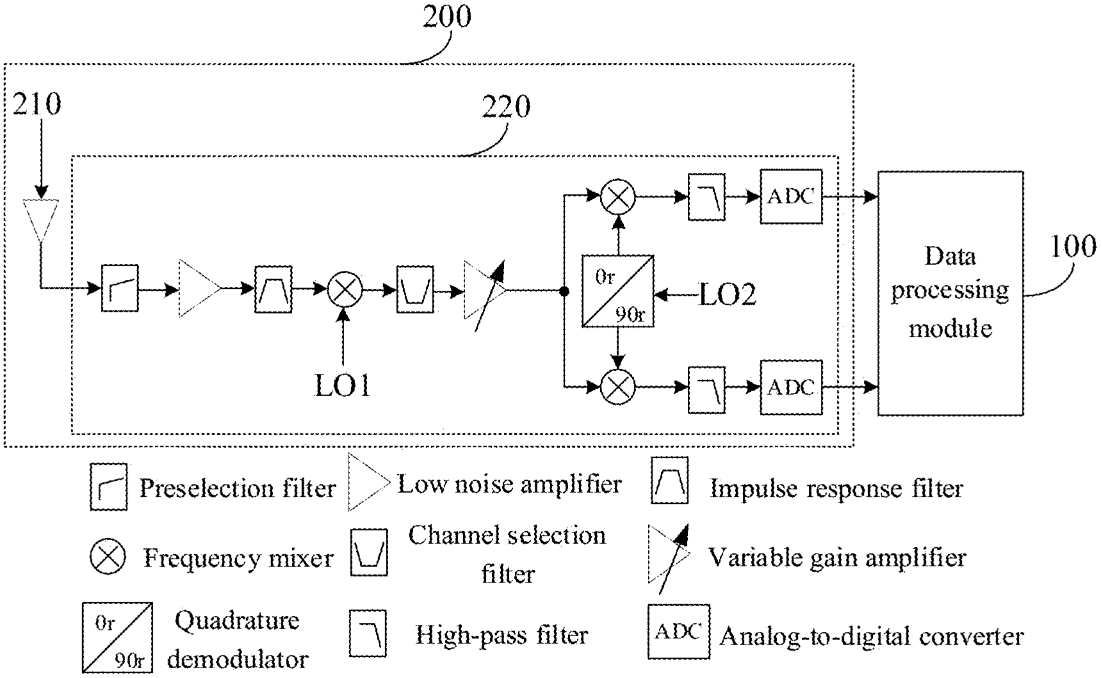
FIG. 5 is a schematic structural diagram of a communication device according to some embodiments of the present disclosure.

In some embodiments, with reference to FIG. 5, the receiver described above is a heterodyne receiver. The heterodyne receiver performs frequency mixing on an input radio frequency signal by using an oscillatory wave generated by a local oscillator (LO), thereby converting the radio frequency signal into an intermediate frequency signal. The frequency of the intermediate frequency signal is a fixed value. Therefore, the heterodyne receiver automatically changes, based on the frequency of the received radio frequency signal, the frequency of the oscillatory wave generated by the local oscillator, such that an intermediate frequency output by a frequency mixer remains unchanged.

It can be learned from FIG. 5 that the heterodyne receiver includes: a preselection filter, a low noise amplifier (LNA), an impulse response filter, a plurality of frequency mixers, a channel selection filter, a variable gain amplifier, a quadrature demodulator, a plurality of high-pass filters, and a plurality of analog-to-digital converters (ADCs). An analog-to-digital converter is a device for converting a digital quantity into an analog quantity.

Figure 6:
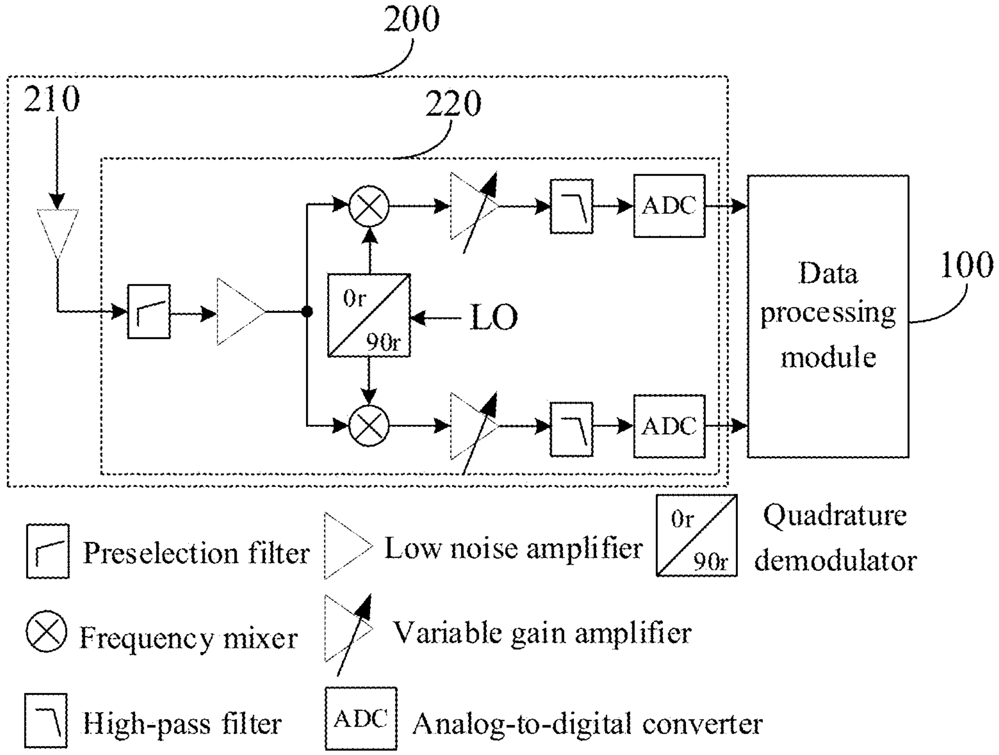
FIG. 6 is a schematic structural diagram of another communication device according to some embodiments of the present disclosure.

In some embodiments, with reference to FIG. 6, the receiver is a direct variable-frequency receiver, also referred to as a homodyne receiver, a synchronous receiver, or a zero intermediate frequency receiver. The direct variable-frequency receiver directly converts a radio frequency signal into a baseband (BB) signal.

It can be learned from FIG. 6 that the direct variable-frequency receiver includes a preselection filter, a low noise amplifier, a plurality of frequency mixers, a quadrature demodulator, a plurality of variable gain filters, a plurality of high-pass filters, and a plurality of analog-to-digital converters.

Figure 7:
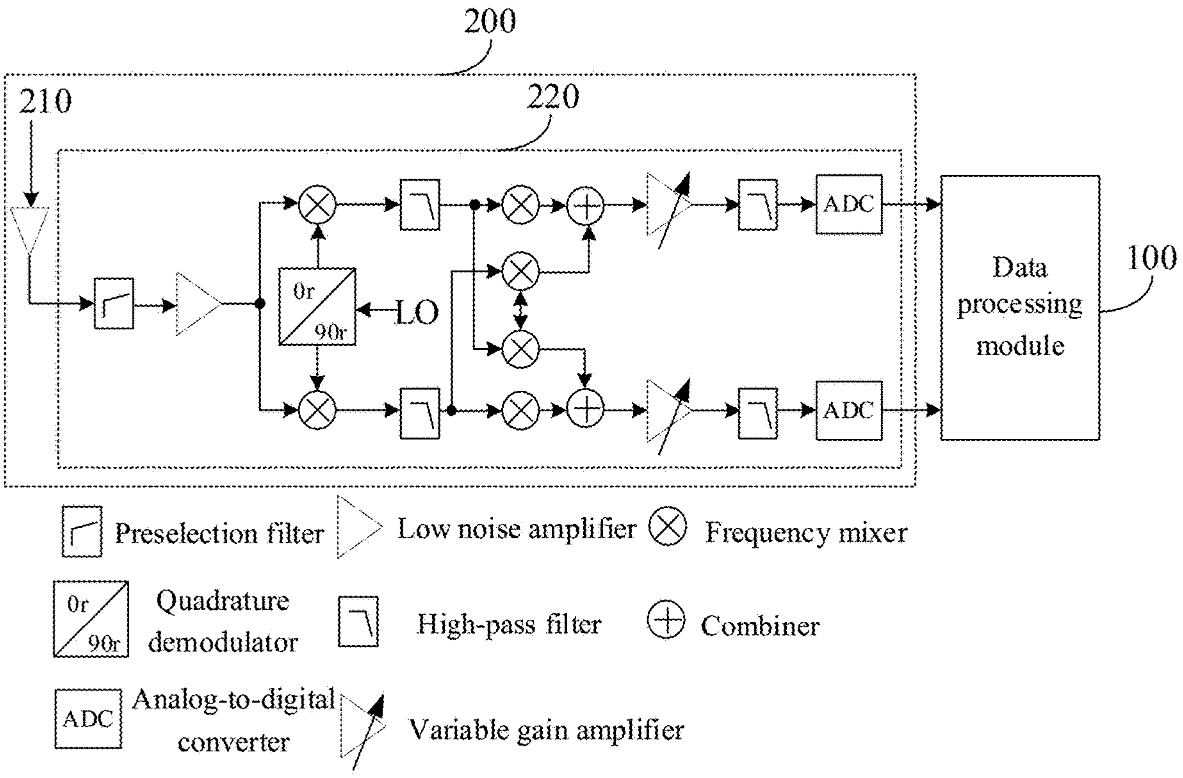
FIG. 7 is a schematic structural diagram of still another communication device according to some embodiments of the present disclosure.

In some embodiments, with reference to FIG. 7, the receiver is a wide intermediate frequency receiver. The wide intermediate frequency receiver is of a dual-conversion architecture. The wide intermediate frequency receiver converts an input radio frequency signal into an intermediate frequency signal at a first stage, and converts the intermediate frequency signal into a baseband signal at a second stage.

As shown in FIG. 7, the wide intermediate frequency receiver includes a preselection filter, a low noise amplifier, a plurality of frequency mixers, a quadrature demodulator, a plurality of high-pass filters, a plurality of combiners, a plurality of variable gain filters, and a plurality of analog-to-digital converters.

Figure 8:
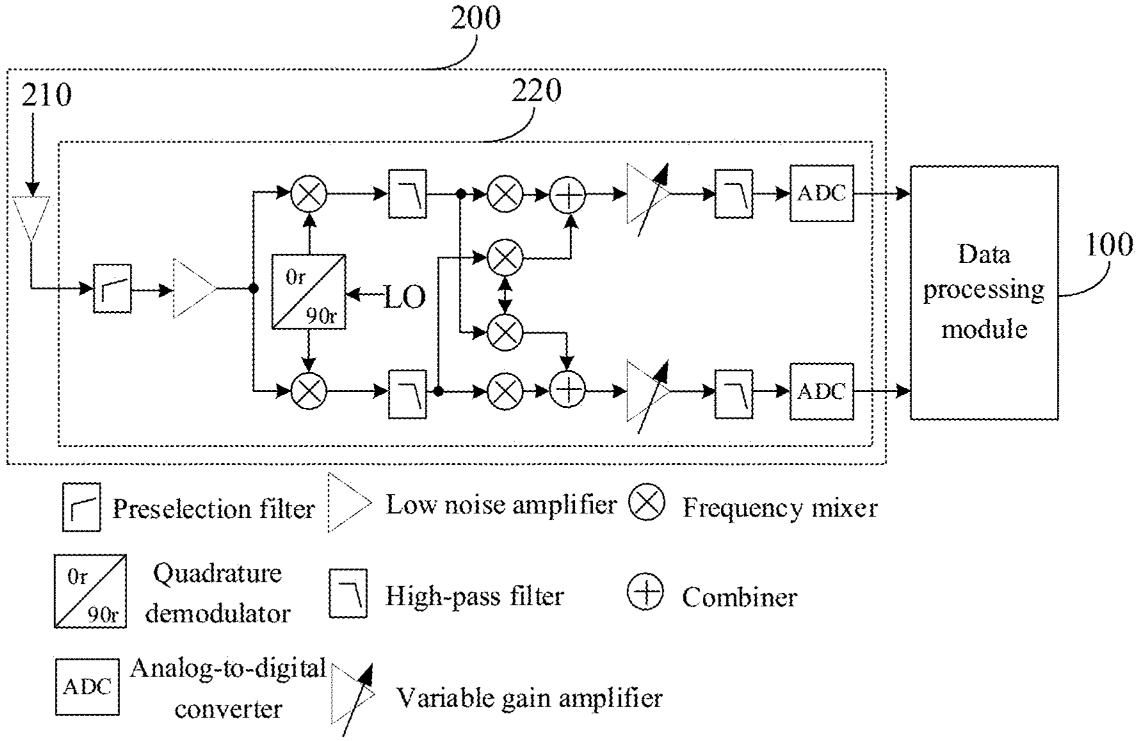
FIG. 8 is a schematic structural diagram of yet another communication device according to some embodiments of the present disclosure.

In some embodiments, with reference to FIG. 8, the receiver is a low intermediate frequency receiver. The low intermediate frequency receiver can first convert an input radio frequency signal into a low intermediate frequency signal, and convert the low intermediate frequency signal into a baseband signal.

As shown in FIG. 8, the low intermediate frequency receiver includes a preselection filter, a low noise amplifier, a plurality of frequency mixers, a quadrature demodulator, a plurality of variable gain filters, a plurality of high-pass filters, and a plurality of analog-to-digital converters.

In the embodiments of the present disclosure, the network architecture of the communication device is a five-layer architecture acquired by simplifying an open system interconnection (OSI) reference model. The five-layer architecture sequentially includes an application layer, a transport layer, a network layer, a data link layer, and a physical layer. The communication device provided in the embodiments of the present disclosure performs the above steps on the physical layer.

Generally, the physical layer provides functions such as bit-by-bit or symbol-by-symbol transmission, modulation and demodulation, encoding and decoding, synchronization, multiplexing, carrier sensing, and collision detection. The data transmission unit of the physical layer is bit. In other words, the physical layer implements data transmission by transmitting a bit stream. The bit stream is divided into a codeword group or a symbol group. The codeword group and the symbol group are converted into a physical signal that can be transmitted through a hardware transmission medium.

The data link layer (also referred to as a partial link layer, a connection layer, and a process layer) aims to ensure reliable transmission of data (that is, to ensure that data transmission is error-free to a large extent), and control access to the transmission medium. The data link layer mainly provides the following services data frame encapsulation, frame synchronization, logical link control (for example, error control and flow control), medium access control, and the like.

The network layer (also referred to as a packet layer) provides specific benefits for switched connections and packet-oriented packet relay services. The network layer mainly provides the following services: model connection, host addressing, message forwarding, and the like. During a switched connection and a data packet relay service, data is transmitted over an entire communication network, including path (for example, routing) between network nodes. Because direct communication is not always available between a sender of the data and a receiver of the data, a packet needs to be forwarded by an in-transit node.

The transport layer is mainly responsible for data transmission and data control, for example, the transport layer alleviates congestion and segment a data flow. The transport layer mainly provides the following services: connection-oriented communication, identical order delivery, flow control, congestion avoidance, port reuse, and the like.

The task of the application layer is to complete a specific network application through interaction between application processes. Application layer protocols define rules for communication and interaction between application processes (programs running on computer devices).

In some embodiments, a network architecture supported by the communication device includes one of the following architectures: a point-to-point network topology structure, a ring network topology structure, a linear network topology structure, a star network topology structure, and a mesh topology structure.

Figure 16:
FIG. 16 is a schematic diagram of a point-to-point network topology structure according to some embodiments of the present disclosure.

With reference to FIG. 16, a point-to-point network topology structure is a structure in which two computer devices in a network are directly connected. Therefore, a point-to-point network topology structure is the simplest topology structure in which a dedicated link exists between two devices.

Figure 17:
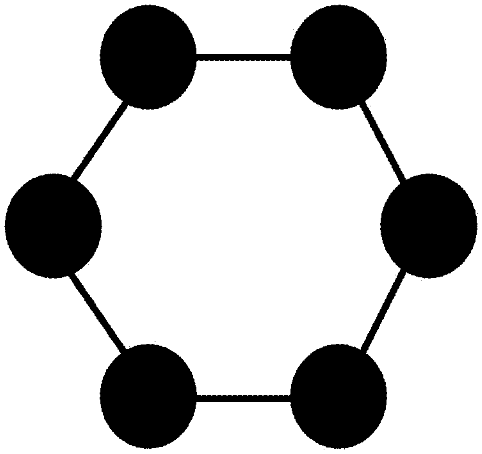
FIG. 17 is a schematic diagram of a ring network topology structure according to some embodiments of the present disclosure.
Figure 18:
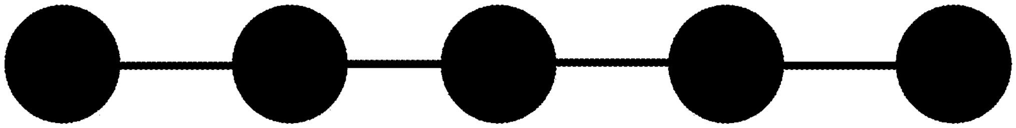
FIG. 18 is a schematic diagram of a linear network topology structure according to some embodiments of the present disclosure.

A ring network topology structure and a linear network topology structure are two different forms of daisy chain topology structures. With reference to FIG. 17 and FIG. 18, in the daisy chain topology structure, a computer device is connected in series to the next computer device. If a message needs to be transmitted to a computer halfway along a circuit, the computer device bounces the message in sequence until the message reaches its destination.

In addition, it can be learned from FIG. 17 that in the ring network topology structure, a plurality of computer devices are connected into a ring. It can be learned from FIG. 18 that in the linear network topology structure, a plurality of computer devices are connected into a line.

Figure 19:
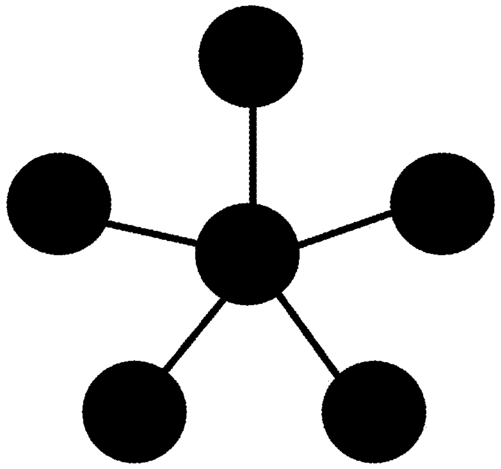
FIG. 19 is a schematic diagram of a star network topology structure according to some embodiments of the present disclosure.

With reference to FIG. 19, the star network topology structure is a structure in which each peripheral node (for example, a computer device or another peripheral device) is connected to a central node. The central node is a hub or a switch. In the star network topology structure, the peripheral node is a client, and the central node is a server.

In some embodiments, to be classified as a star network, a network of connected computer devices does not have to be starlike. As long as all peripheral nodes in a network are connected to one central node, the network can be classified as a star network.

Figure 20:
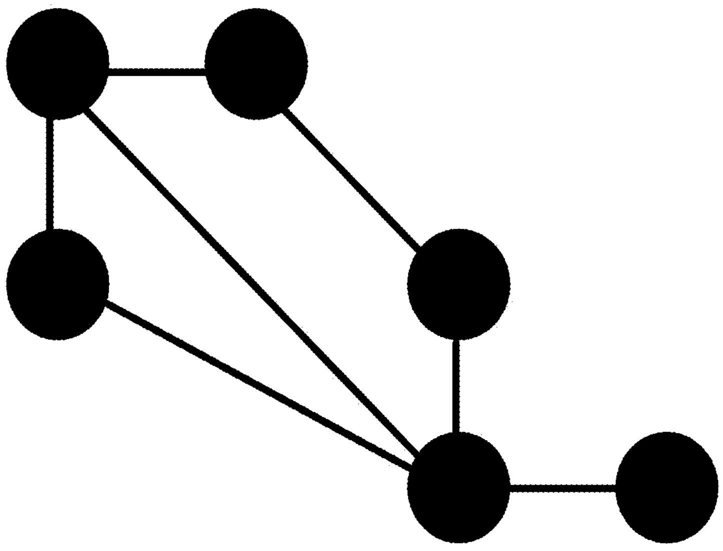
FIG. 20 is a schematic diagram of a mesh network topology structure according to some embodiments of the present disclosure.

With reference to FIG. 20, a mesh topology structure is a structure in which all computer devices are connected together through transmission lines. A mesh topology structure is also referred to as a multi-hop network topology structure.

It should be noted that, the order of the steps of the method for transmitting signals provided in the embodiments of the present disclosure can be appropriately adjusted. The steps may also be removed or added as required. For example, step 205 to step 208 may be deleted as required, or may be performed before step 201. Within the technical scope of the present disclosure, any variations to the method readily derived by a person skilled in the art shall fall within the protection scope of the present disclosure, and details are not described herein again.

In summary, the embodiments of the present disclosure provide a method for transmitting signals, according to which the communication device converts data to be transmitted into an image, converts the image as preprocessed into data, and performs modulation. In this way, it can be ensured that the transmission reliability of a radio frequency signal is higher. In addition, as data to be transmitted is preprocessed through image processing, the processing efficiency of the data is improved.

Figure 21:
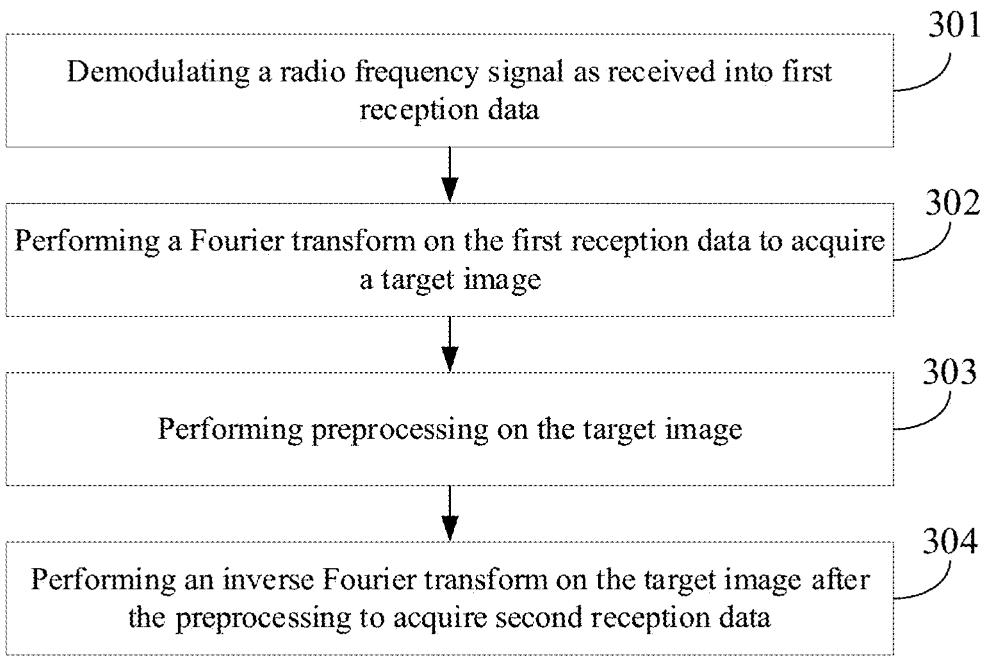
FIG. 21 is a flowchart of still another method for transmitting signals according to some embodiments of the present disclosure.

FIG. 21 is a flowchart of still another method for transmitting signals according to some embodiments of the present disclosure. The method is applicable to a communication device. With reference to FIG. 21, the method includes the following steps.

In step 301, a radio frequency signal as received is demodulated into first reception data.

The implementation process of step 301 refers to the implementation process of step 205. Details are not described herein again in the embodiments of the present disclosure.

In step 302, a Fourier transform is performed on the first reception data to acquire a target image.

In the embodiments of the present disclosure, the target image is a spectrogram of the first reception data. The spectrogram of the first reception data is a graph of frequencies of the first reception data over time.

Alternatively, the target image is a coded image of the first reception data. In this case, a process in which the communication device performs the Fourier transform on the first reception data to acquire the target image includes: performing the Fourier transform on the first reception data by the communication device to acquire the spectrogram of the first reception data. Then, the communication device determines a coded image corresponding to the spectrogram of the first reception data as the target image based on the mapping relationship between the spectrograms and the coded images.

In step 303, preprocessing is performed on the target image.

The preprocessing includes at least one of decompression, decryption, or verification.

In step 304, an inverse Fourier transform is performed on the target image after the preprocessing to acquire second reception data.

The implementation process of step 304 refers to the implementation process of step 208. Details are not described herein again in the embodiments of the present disclosure.

In summary, the embodiments of the present disclosure provide a method for transmitting signals, according to which the communication device converts data to be transmitted into an image, converts the image as preprocessed into data, and performs modulation. In this way, it can be ensured that the transmission reliability of a radio frequency signal is higher. In addition, as data to be transmitted is preprocessed through image processing, the processing efficiency of the data is improved.

Figure 22:
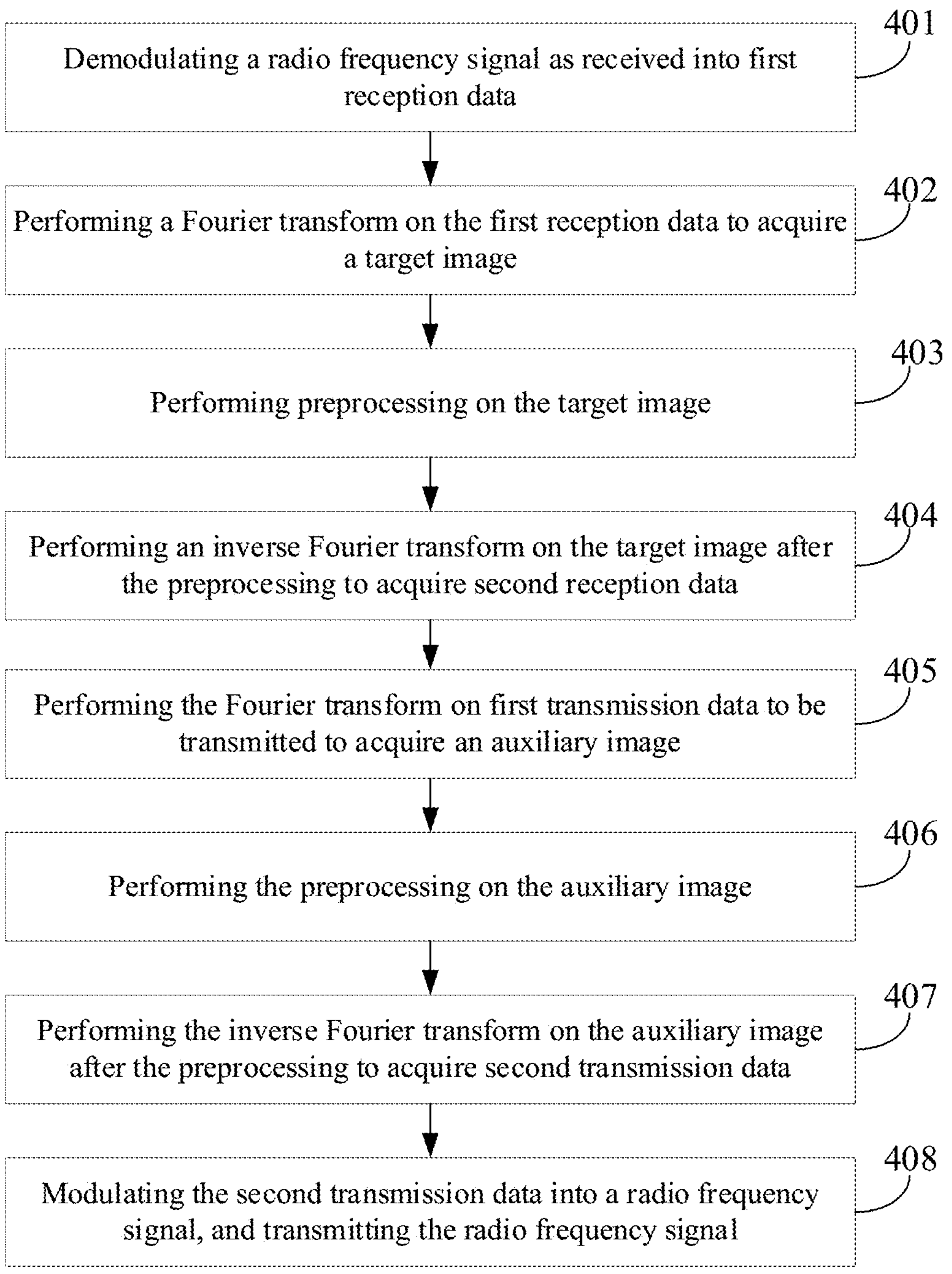
FIG. 22 is a flowchart of yet another method for transmitting signals according to some embodiments of the present disclosure.

FIG. 22 is a flowchart of yet another method for transmitting signals according to some embodiments of the present disclosure. The method is applied to a communication device. With reference to FIG. 22, the method includes the following steps.

In step 401, a radio frequency signal as received is demodulated into first reception data.

In step 402, a Fourier transform is performed on the first reception data to acquire a target image.

In step 403, preprocessing is performed on the target image.

The preprocessing includes at least one of decompression, decryption, or verification.

In step 404, an inverse Fourier transform is performed on the target image after the preprocessing to acquire second reception data.

It may be understood that, the implementation process of step 401 to step 404 refers to a related implementation process of step 205 to step 208. Details are not described herein again in the embodiments of the present disclosure.

In step 405, the Fourier transform is performed on first transmission data to be transmitted to acquire an auxiliary image.

The implementation process of step 405 refers to the implementation process of step 201. Details are not described herein again in the embodiments of the present disclosure.

In step 406, preprocessing is performed on the auxiliary image.

In some embodiments, for ease of distinguishing, the preprocessing performed on the target image is referred to as third preprocessing; and the preprocessing performed on the auxiliary image is referred to as fourth preprocessing. The fourth preprocessing includes at least one of compression, encryption, or verification. For example, the fourth preprocessing includes compression, encryption, or verification.

In step 407, the inverse Fourier transform is performed on the auxiliary image after the preprocessing to acquire second transmission data.

In step 408, the second transmission data is modulated into a radio frequency signal, and the radio frequency signal is transmitted.

The implementation process of step 407 and step 408 refers to the implementation process of step 203 and step 204. Details are not described herein again in the embodiments of the present disclosure.

It should be noted that, the order of the steps of the method for transmitting signals provided in the embodiments of the present disclosure can be appropriately adjusted. The steps may also be removed or added as required. For example, step 405 to step 408 may be deleted as required. Within the technical scope of the present disclosure, any variations to the method readily derived by a person skilled in the art shall fall within the protection scope of the present disclosure, and details are not described herein again.

In summary, the embodiments of the present disclosure provide a method for transmitting signals, according to which the communication device converts data to be transmitted into an image, converts the image as preprocessed into data, and performs modulation. In this way, it can be ensured that the transmission reliability of a radio frequency signal is higher. In addition, as data to be transmitted is preprocessed through image processing, the processing efficiency of the data is improved.

Some embodiments of the present disclosure provide a communication device. With reference to FIG. 9, the communication device 00 includes a data processing module 100 and a signal-transmitting assembly 200.

The data processing module 100 is configured to: perform a Fourier transform on first data to be transmitted to acquire a first image, perform first preprocessing on the first image, and perform an inverse Fourier transform on the first image after the first preprocessing to acquire second data, wherein the first preprocessing includes at least one of compression, encryption, or verification.

The signal-transmitting assembly 200 is configured to: modulate the second data into a first radio frequency signal, and transmit the first radio frequency signal.

In some embodiments, with reference to FIG. 10 to FIG. 15, the data processing module 100 includes a processing device 110 and an interface circuit 120. The processing device 110 is connected to the interface circuit 120, and is configured to: perform a Fourier transform on the first data to be transmitted to acquire the first image, perform the first preprocessing on the first image, and perform an inverse Fourier transform on the first image after the first preprocessing to acquire the second data.

The interface circuit 120 is further connected to the signal-transmitting assembly 200, and is configured to transmit the second data to the signal-transmitting assembly 200.

In some embodiments, the processing device includes at least one of the following devices: a digital signal processor, a field programmable gate array, an embedded processor, a central processing unit, or a system on a chip.

In some embodiments, with reference to FIG. 5 to FIG. 8, the signal-transmitting assembly 200 includes a radio frequency antenna 210 and a transmitter 220. The transmitter 220 is one of the following transmitters: a heterodyne transmitter, a superheterodyne transmitter, a zero intermediate frequency transmitter, a broadband intermediate frequency transmitter, and a low intermediate frequency transmitter.

In summary, some embodiments of the present disclosure provide a communication device. The communication device converts data to be transmitted into an image, converts the image as preprocessed into data, and performs modulation. In this way, it can be ensured that the transmission reliability of a radio frequency signal is higher. In addition, as data to be transmitted is preprocessed through image processing, the processing efficiency of the data is improved.

Figure 23:
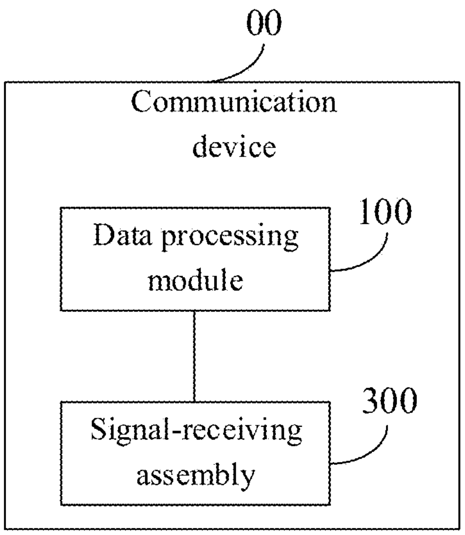
FIG. 23 is a schematic structural diagram of yet another communication device according to some embodiments of the present disclosure.

Some embodiments of the present disclosure further provide a communication device. With reference to FIG. 23, the communication device 00 includes a data processing module 100 and a signal-receiving assembly 300. The signal-receiving assembly 300 is configured to demodulate a radio frequency signal as received into first reception data.

The data processing module 100 is configured to: perform a Fourier transform on the first reception data to acquire a target image, perform preprocessing on the target image, and perform an inverse Fourier transform on the target image after the preprocessing to acquire second reception data, wherein the preprocessing includes at least one of decompression, decryption, or verification.

In some embodiments, the signal-receiving assembly 300 includes a radio frequency antenna and a receiver. The receiver is one of the following receivers: a heterodyne receiver, a superheterodyne receiver, a zero intermediate frequency receiver, a broadband intermediate frequency receiver, and a low intermediate frequency receiver.

In summary, some embodiments of the present disclosure provide a communication device. The communication device converts first reception data as received into an image, and performs preprocessing on the image to acquire second reception data. Therefore, the reliability of signal transmission is higher. In addition, as the communication device implements the preprocessing of data through image processing, the processing efficiency of the data is improved.

Some embodiments of the present disclosure provide a communication device. The communication device includes a memory, a processor, and a computer program stored in the memory and capable of running on the processor. The processor, when executing the computer program, is caused to perform the method for transmitting signals according to the above embodiments, for example, the method shown in FIG. 1, FIG. 2, FIG. 21, or FIG. 22.

Some embodiments of the present disclosure provide a non-transitory computer-readable storage medium. The computer-readable storage medium stores a computer program. The computer program, when loaded and executed by a processor, causes the processor to perform the method for transmitting signals according to the above embodiments, for example, the method shown in FIG. 1, FIG. 2, FIG. 21, or FIG. 22.

Some embodiments of the present disclosure further provide a computer program product including instructions. The computer program product, when run by a computer, causes the computer to perform the method for transmitting signals according to the above method embodiments, for example, the method shown in FIG. 1, FIG. 2, FIG. 21, or FIG. 22.

Those of ordinary skill in the art can understand that all or some of the steps of implementing the foregoing embodiments can be completed by hardware, or can be completed by instructing relevant hardware by a program. The program can be stored in a non-transitory computer-readable storage medium.

It should be understood that the term "and/or" in the specification may indicate that there may be three types of relationships. For example, A and/or B indicate three situations: A exists alone, A and B exist simultaneously, and B exists alone. The character "/" generally indicates that the associated objects are in an "or" relationship. In addition, the term "at least one" in the present disclosure means one or more, and "a plurality of" in the present disclosure means two or more.

The terms such as "first" and "second" in the present disclosure are used to distinguish between the same items or similar items that have basically the same purposes and functions. It should be understood that there is no logical or time sequence dependency between "first", "second", and "nth", and a quantity and an execution sequence are not limited. For example, without departing from the scope of the described examples, first data may be referred to as second data, and similarly, second data may be referred to as first data.

The above are merely exemplary embodiments of the present disclosure, but are not intended to limit the present disclosure. Any modifications, equivalent replacements and improvements made within the spirits and principles of the present disclosure shall all fall in the protection scope of the present disclosure.

The invention claimed is:

1. A method for transmitting signals, applied to a communication device comprising: a data processing module and a signal-transmitting assembly, the method comprising:

acquiring, by the data processing module, a first image by performing a Fourier transform on first data to be transmitted;

performing, by the data processing module, first preprocessing on the first image, wherein the first preprocessing comprises at least one of compression, encryption, or verification;

acquiring, by the data processing module, second data by performing an inverse Fourier transform on the first image after the first preprocessing; and modulating, by the signal-transmitting assembly, the second data into a first radio frequency signal, and transmitting the first radio frequency signal, wherein the acquiring, by the data processing module, the first image by performing the Fourier transform on the first data to be transmitted comprises:

acquiring, by the data processing module, a spectrogram of the first data by performing the Fourier transform on the first data to be transmitted, wherein the spectrogram of the first data is a graph of frequencies the first data over time; and determining, by the data processing module, a first coded image corresponding to the spectrogram as the first image based on a mapping relationship between spectrograms and coded images.

2. The method according to claim 1, wherein the first image is a spectrogram of the first data, and the spectrogram of the first data is a graph of frequencies of the first data over time.

3. The method according to claim 1, wherein the first coded image is a two-dimensional code image or a bar code image.

4. The method according to claim 1, wherein performing, by the data processing module, the first preprocessing on the first image comprises:

acquiring, by the data processing module, the first image after the first preprocessing by inputting the first image into the first image preprocessing model, wherein the first image preprocessing model is acquired by training a plurality of first sample image sets, wherein each of the first sample image sets comprises a first sample image and a second sample image, wherein the first sample image is acquired by performing the Fourier transform on first sample data, and the second sample image is acquired by performing the Fourier transform on the first sample data after the first preprocessing.

5. The method according to claim 1, further comprising:

demodulating, by the data processing module, a second radio frequency signal as received into third data;

acquiring, by the data processing module, a second image by performing the Fourier transform on the third data;

performing, by the data processing module, second preprocessing on the second image, wherein the second preprocessing comprises at least one of decompression, decryption, or verification; and acquiring, by the data processing module, fourth data by performing the inverse Fourier transform on the second image after the second preprocessing.

6. The method according to claim 5, wherein the second image is a spectrogram of the third data, wherein the spectrogram of the third data is a graph of frequencies the third data over time.

7. The method according to claim 5, wherein acquiring, by the data processing module, the second image by performing the Fourier transform on the third data comprises:

acquiring, by the data processing module, a spectrogram of the third data by performing the Fourier transform on the third data, wherein the spectrogram of the third data is a graph of frequencies of the third data over time; and determining, by the data processing module, a second coded image corresponding to the spectrogram of the third data as the second image based on a mapping relationship between the spectrograms and the coded images.

8. The method according to claim 7, wherein the second coded image is a two-dimensional code image or a bar code image.

9. The method according to claim 5, wherein performing, by the data processing module, the second preprocessing on the second image comprises:

acquiring, by the data processing module, the second image after the second preprocessing by inputting the second image into the second image preprocessing model, wherein the second image preprocessing model is acquired by training a plurality of second sample image sets, wherein each of the second sample image sets comprises a third sample image and a fourth sample image, wherein the third sample image is acquired by performing the Fourier transform on second sample data, and the fourth sample image is acquired by performing the Fourier transform on the second sample data after the second preprocessing.

10. A communication device, comprising: a data processing module and a signal-transmitting assembly, wherein the data processing module is configured to: perform a Fourier transform on first data to be transmitted to acquire a first image, perform first preprocessing on the first image, and perform an inverse Fourier transform on the first image after the first preprocessing to acquire second data, wherein the first preprocessing comprises at least one of compression, encryption, or verification; and the signal-transmitting assembly is configured to: modulate the second data into a first radio frequency signal, and transmit the first radio frequency signal, wherein the data processing module is configured to:

acquire a spectrogram of the first data by performing the Fourier transform on the first data to be transmitted, wherein the spectrogram of the first data is a graph of frequencies the first data over time; and determine a first coded image corresponding to the spectrogram as the first image based on a mapping relationship between spectrograms and coded images.

11. The communication device according to claim 10, wherein the first image is a spectrogram of the first data, and the spectrogram of the first data is a graph of frequencies of the first data over time.

12. The communication device according to claim 10, wherein the data processing module comprises: a processing assembly and an interface circuit, wherein the processing assembly is connected to the interface circuit, and is configured to: perform the Fourier transform on the first data to be transmitted to acquire the first image, perform the first preprocessing on the first image, and perform the inverse Fourier transform on the first image after the first preprocessing to acquire the second data; and the interface circuit is further connected to the signal-transmitting assembly, and is configured to transmit the second data to the signal-transmitting assembly.

13. The communication device according to claim 12, wherein the processing assembly comprises at least one of: a digital signal processor, a field programmable gate array, an embedded processor, a central processing unit, or a system on a chip.

14. The communication device according to claim 10, wherein the signal-transmitting assembly comprises a radio frequency antenna and a transmitter, wherein the transmitter is one of: a heterodyne transmitter, a superheterodyne transmitter, a zero intermediate frequency transmitter, a broadband intermediate frequency transmitter, and a low intermediate frequency transmitter.

15. The communication device according to claim 10, further comprising a signal-receiving assembly, wherein the signal-receiving assembly is configured to demodulate a second radio frequency signal as received into third data; and the data processing module is configured to: perform the Fourier transform on the third data to acquire a second image, perform second preprocessing on the second image, and perform the inverse Fourier transform on the second image after the second preprocessing to acquire fourth data, wherein the second preprocessing comprises at least one of decompression, decryption, and verification.

16. The communication device according to claim 15, wherein the second image is a spectrogram of the third data, wherein the spectrogram of the third data is a graph of frequencies the third data over time; or the data processing module is configured to:

perform the Fourier transform on the third data to acquire a spectrogram of the third data, wherein the spectrogram of the third data is a graph of frequencies of the third data over time; and determine a second coded image corresponding to the spectrogram of the third data as the second image based on a mapping relationship between the spectrograms and the coded images.

17. The communication device according to claim 15, wherein the signal-receiving assembly comprises: a radio frequency antenna and a receiver, wherein the receiver is one of: a heterodyne receiver, a superheterodyne receiver, a zero intermediate frequency receiver, a broadband intermediate frequency receiver, and a low intermediate frequency receiver.

18. A communication device, comprising: a memory, a processor, and a computer program stored in the memory and capable of running on the processor, wherein the processor, when executing the computer program, is caused to perform:

acquiring a first image by performing a Fourier transform on first data to be transmitted;

performing first preprocessing on the first image, wherein the first preprocessing comprises at least one of compression, encryption, or verification;

acquiring second data by performing an inverse Fourier transform on the first image after the first preprocessing; and modulating the second data into a first radio frequency signal, and transmitting the first radio frequency signal, wherein acquiring the first image by performing the Fourier transform on the first data to be transmitted comprises:

acquiring a spectrogram of the first data by performing the Fourier transform on the first data to be transmitted, wherein the spectrogram of the first data is a graph of frequencies the first data over time; and determining a first coded image corresponding to the spectrogram as the first image based on a mapping relationship between spectrograms and coded images.

19. A non-transitory computer-readable storage medium, storing a computer program, wherein the computer program, when loaded and executed by a processor, causes the processor to perform the method for transmitting signals as defined in claim 1.

* * * * *